(12) United States Patent
Wu

(10) Patent No.: US 6,380,519 B1
(45) Date of Patent: Apr. 30, 2002

(54) ELECTRICAL OVEN HAVING A HOUSING WITH A TURNABLE LID

(75) Inventor: Tsan Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 09/842,936

(22) Filed: Apr. 26, 2001

(51) Int. Cl.[7] .................................................. A21B 1/22
(52) U.S. Cl. ........................ 219/391; 219/386; 219/524; 126/190; 99/385; 99/449; 99/340
(58) Field of Search ................................ 219/386, 391, 219/524; 99/385, 449, 340; 126/190, 194

(56) References Cited

U.S. PATENT DOCUMENTS

| | | | | |
|---|---|---|---|---|
| 3,756,219 A | * | 9/1973 | Snyder et al. | 126/191 |
| 3,845,272 A | * | 10/1974 | Schultz et al. | 219/386 |
| D304,147 S | * | 10/1989 | Takada et al. | D7/350 |
| 5,735,190 A | * | 4/1998 | Sham | 99/327 |
| 6,305,274 B1 | * | 10/2001 | Sherman | 99/393 |

* cited by examiner

Primary Examiner—Tu Ba Hoang
Assistant Examiner—Shawntina T. Fuqua
(74) Attorney, Agent, or Firm—Trop, Pruner & Hu, P.C.

(57) ABSTRACT

An electrical oven includes a housing defining an inner space and having a bottom wall, two opposite side walls, a lid that is mounted pivotally on the side walls and that confine the inner space at rear and top sides of the housing, and a front opening for access to the inner space. A door is mounted on the side walls for closing the front opening. The lid is turnable relative to the bottom wall between a closed position, in which the lid confines the inner space at the rear and top sides of the housing, and an open position, in which the lid turns away from the door so as to permit the inner space to be exposed at the rear and top sides of the housing. A locking device is mounted on the lid so as to lock the lid unto the side walls when the lid is at the closed position.

5 Claims, 8 Drawing Sheets

ELECTRICAL OVEN HAVING A HOUSING WITH A TURNABLE LID

BACKGROUND OF THE INVENTION

1. Field of the Invention

This invention relates to an electrical oven, more particularly to an electrical oven having a housing with a turnable lid.

2. Description of the Related Art

FIG. 1 illustrates a conventional electrical oven which includes an integral single housing 11 confining therein an inner space and having a front opening 112 for access to the inner space. A door 14 is mounted pivotally on the housing 11 for closing the front opening 112. An electrical heater 15 is disposed in the housing 11. The conventional electrical oven is disadvantageous in that since the front opening 112 is the only route for accessing the inner space of the housing 11, it is relatively inconvenient to clean the interior of the housing 11.

SUMMARY OF THE INVENTION

Therefore, it is an object of the present invention to provide an electrical oven having a housing with a turnable lid that is capable of overcoming the aforementioned drawback.

Accordingly, the electrical oven of the present invention comprises: a housing defining an inner space therein and having top and bottom sides, left and right sides, front and rear sides, and a front opening at the front side for access to the inner space, the housing including a bottom wall that confines the inner space at the bottom side of the housing, two opposite side walls that project upwardly from the bottom wall to confine the inner space at the left and right sides of the housing, a lid that is mounted pivotally and selectively on one of the bottom wall and the side walls and that projects upwardly from the bottom wall to confine the inner space at the rear side of the housing and then turns frontwardly to the front side of the housing to confine the inner space at the top side of the housing, and a door that is mounted pivotally and selectively on one of the bottom wall and the side walls for closing the front opening, the lid being turnable relative to the bottom wall between a closed position, in which the lid confines the inner space at the rear and top sides of the housing, and an open position, in which the lid turns away from the door so as to permit the inner space to be exposed at the rear and top sides of the housing; a locking device selectively mounted on one of the lid and the side walls so as to lock the lid unto at least one of the side walls when the lid is at the closed position; and at least an electrical heater mounted in the housing.

BRIEF DESCRIPTION OF THE DRAWINGS

In drawings which illustrate an embodiment of the invention.

DETAILED DESCRIPTION OF THE PREFERRED EMBODIMENT

Figure 1:
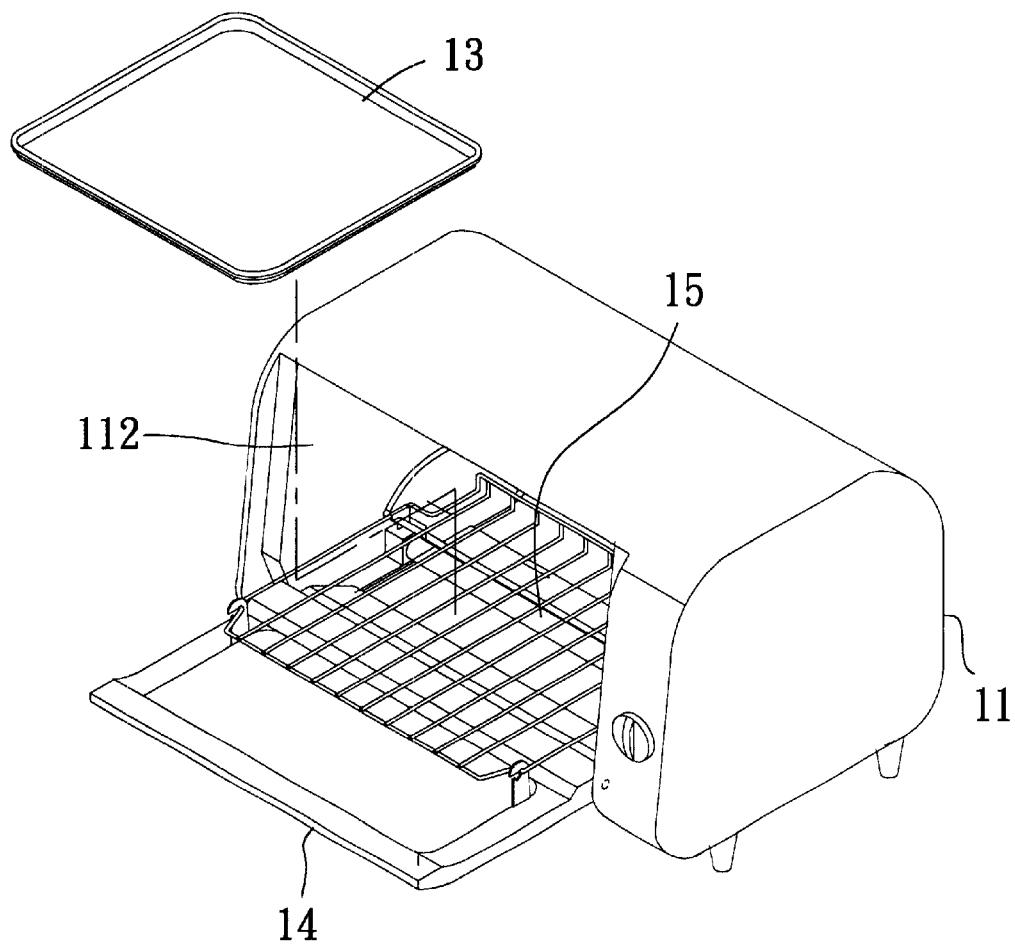
FIG. 1 illustrates a conventional electrical oven.

FIGS. 2 to 8 illustrate an electrical oven embodying the present invention. The electrical oven includes a housing 2, a locking device 6, upper and lower heaters 24 mounted in the housing 2, a supporting rack 261 mounted slidably in the housing 2, an upper tray 27 supported by the supporting rack 261, and a bottom tray 22 disposed in the housing 2 below the supporting rack 261.

Figure 2:
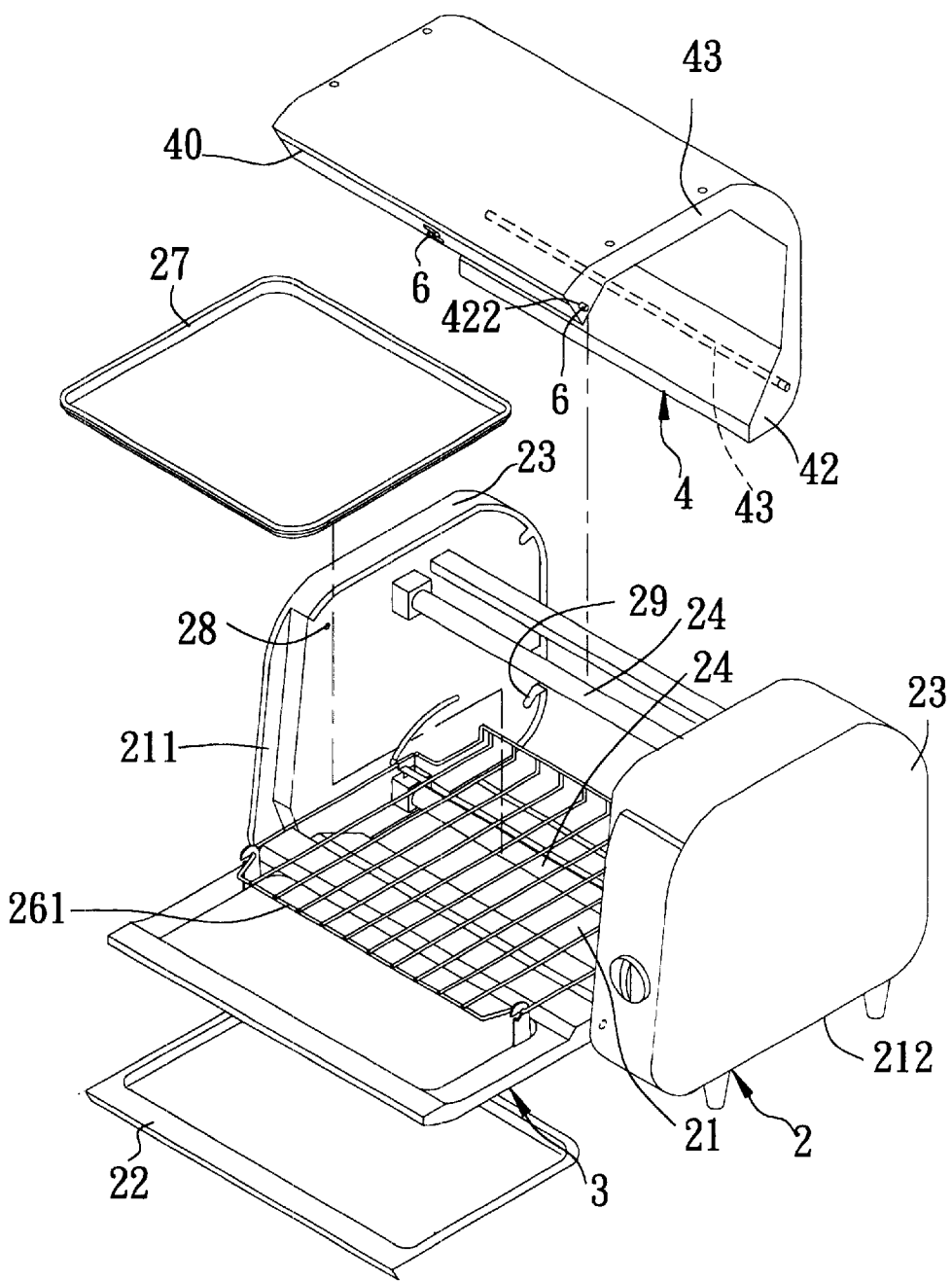
FIG. 2 is an exploded perspective view of an electrical oven embodying this invention.
Figure 3:
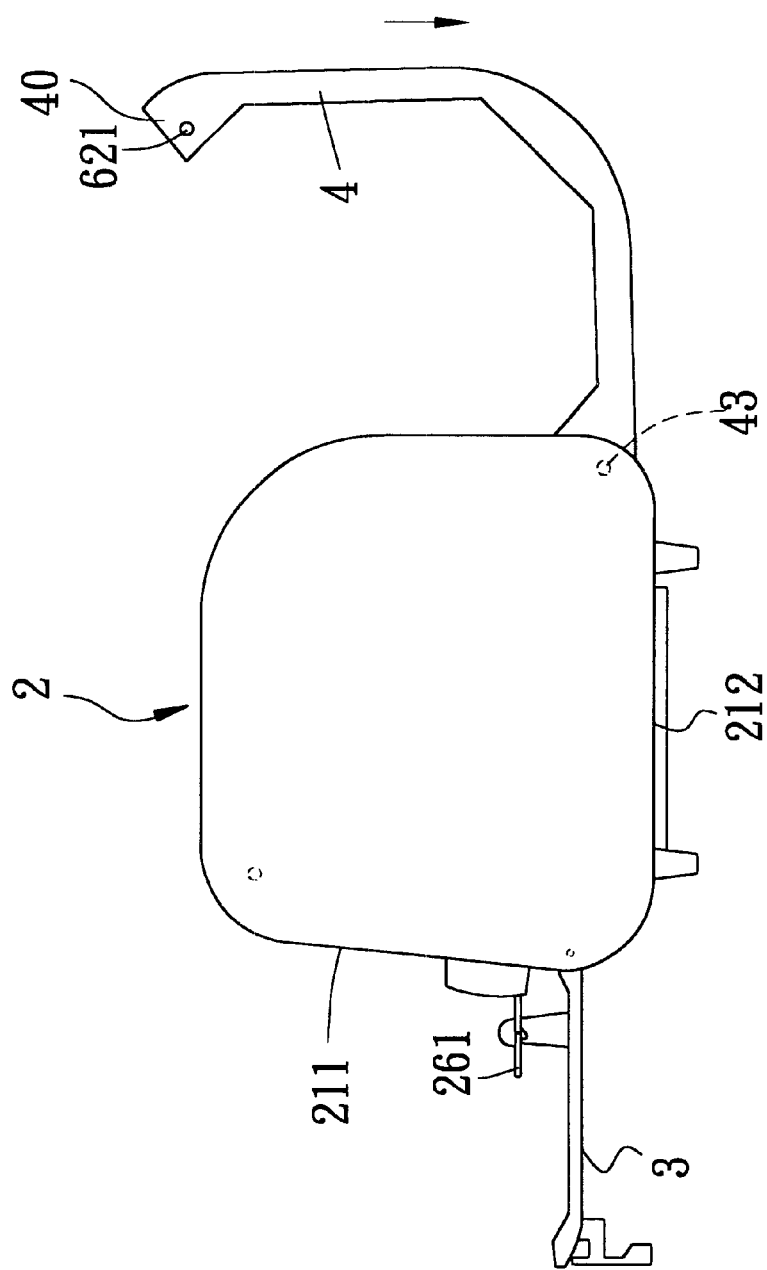
FIG. 3 is a side view of the electrical oven of FIG. 2, with a lid and a door at open positions.
Figure 4:
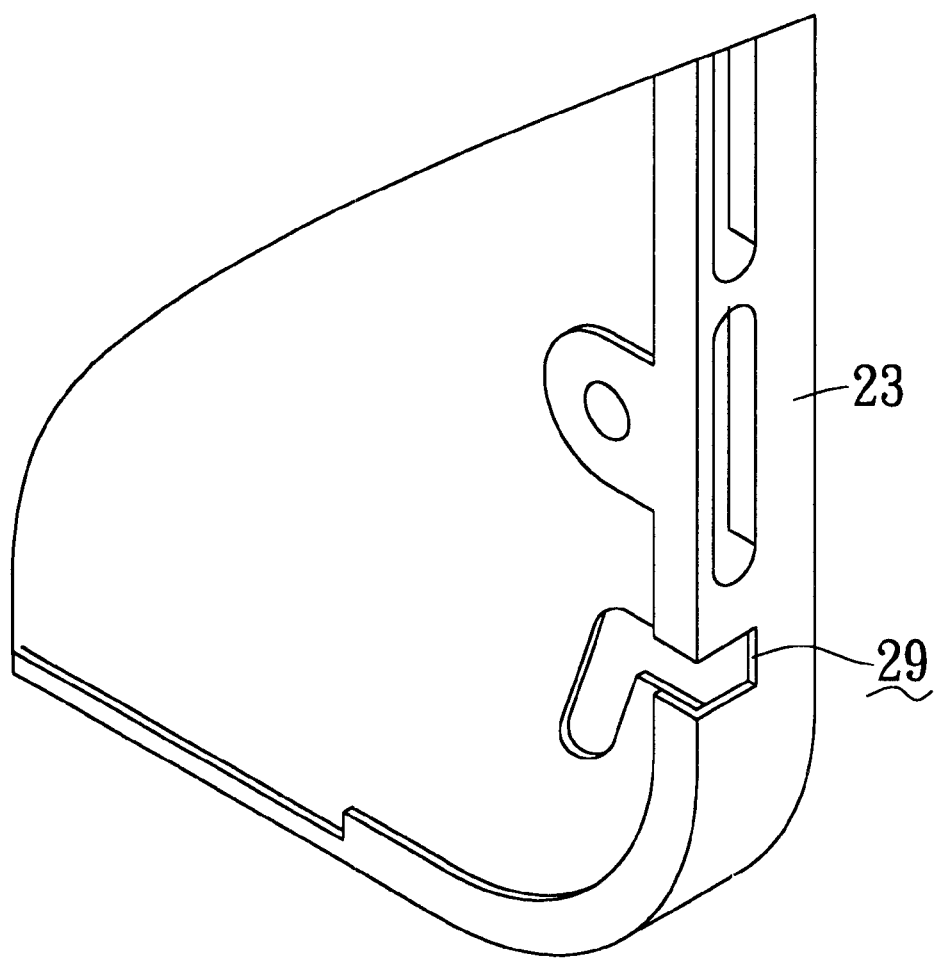
FIG. 4 is a fragmentary perspective view to illustrate a pivotal notch in a side wall of a housing of the electrical oven of FIG. 2.

Referring to FIGS. 2 and 3, the housing 2 defines an inner space 21 therein, has top and bottom sides, left and right sides, front and rear sides, and a front opening 211 at the front side for access to the inner space 21, and includes a bottom wall 212 that confines the inner space 21 at the bottom side of the housing 2, two opposite side walls 23 that project upwardly from the bottom wall 212 to confine the inner space 21 at the left and right sides of the housing 2, and an L-shaped lid 4 that has a rear bottom end 42 mounted pivotally on the side walls 23 at the rear and bottom sides of the housing 2 and that projects upwardly from the bottom wall 212 to confine the inner space 21 at the rear side of the housing 2 and then turns frontwardly to the front and top sides of the housing 2 to confine the inner space 21 at the top side of the housing 2. A door 3 is mounted pivotally on the side walls 23 at the front and bottom sides of the housing 2 for closing the front opening 211. The lid 4 is turnable relative to the bottom wall 212 between a closed position, in which the lid 4 confines the inner space 21 at the rear and top sides of the housing 2, and an open position, in which the lid 4 turns away from the door 3 so as to permit the inner space 21 to be exposed at the rear and top sides of the housing 2.

Each of the side walls 23 is formed with a retaining hole 28 at the front and top sides of the housing 2, and a pivotal notch 29 at the rear and bottom sides of the housing 2. The rear bottom end 42 of the lid 4 is pivoted to the side walls 23 via a pivot pin 43 extending through the rear bottom end 412 of the lid 4 and the pivotal notches 29 (refer to FIG. 4) in the side walls 23. With the pivotal notches 29 in the side walls 23, the lid 4 can be easily mounted on and dismounted from the side walls 23. It is noted that instead of being mounted on the side walls 23, the lid 4 and the door 3 can also be pivoted on the bottom wall 212.

Figure 5:
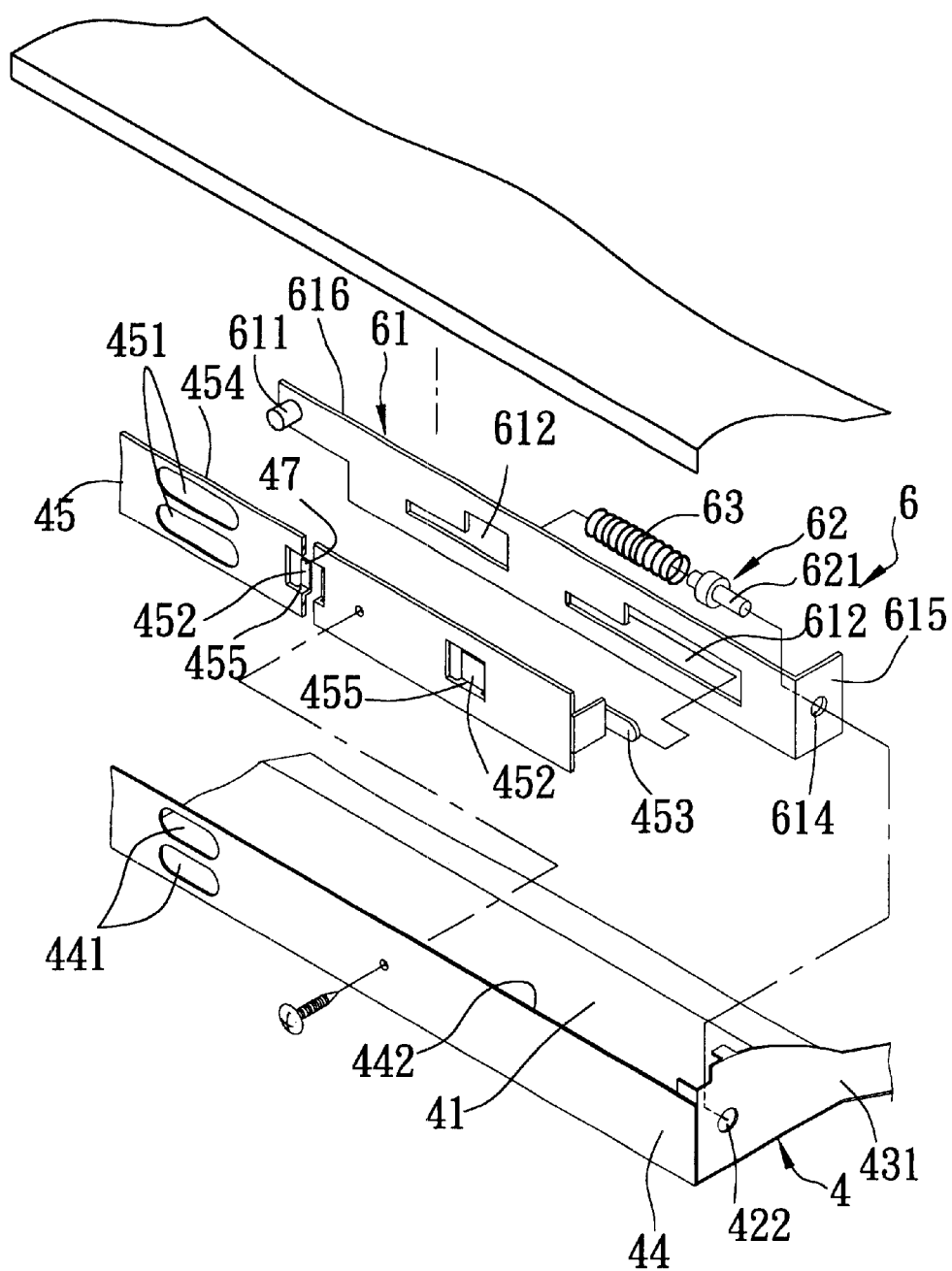
FIG. 5 is an exploded perspective view to illustrate a locking device for locking a lid unto the side walls of the housing of the electrical oven of FIG. 2.
Figure 6:
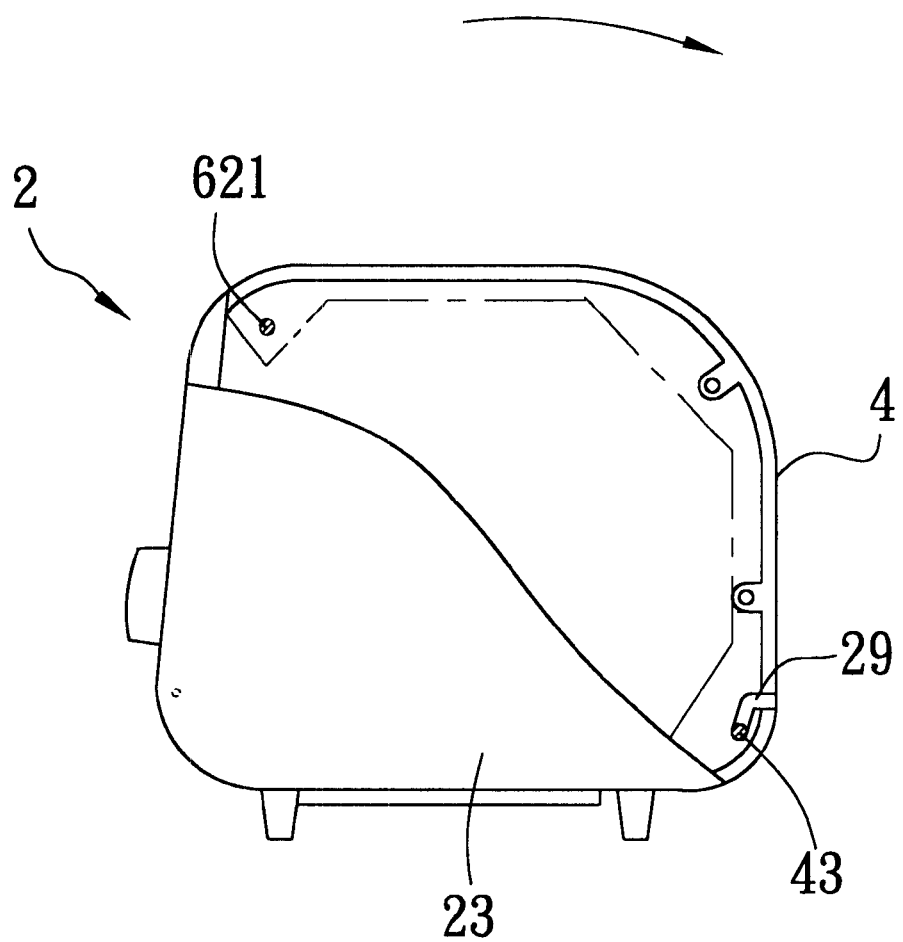
FIG. 6 is a side view of the electrical oven of FIG. 2, with the lid and the door at closed positions.

Referring to FIGS. 2 and 5, the lid 4 is in the form of a shell and has a front top end 40 defining an inner mounting space 41 therein and having a front plate 44 that confines a front side of the inner mounting space 41, that extends between the side walls 23, that is substantially flush with the door 4, and that has an inner face 442. The lid 4 further includes two opposite side plates 43 that respectively extend from two opposite sides of the front plate 44 to the rear bottom end 42 of the lid 4 and that have front end portions 431 respectively confining left and right sides of the inner mounting space 41. A through-hole 422 is formed in each of the front end portions 431 of the side plates 43, and is registered horizontally with an adjacent one of the retaining holes 28 in the side walls 23. A pair of first slots 441 are formed in the front plate 44.

The locking device 6 is disposed in the inner mounting space 41 in the front top end 40 of the lid 4, and includes at least a spring-biased latch 62 that is mounted movably on the front plate 44 of the front top end 40 of the lid 4 and that is operable to be moved in a transverse direction relative to the side walls 23 between a locking position, in which the latch 62 moves into an adjacent one of the retaining holes 28 so as to permit the lid 4 to be held at the closed position, and an unlocking position, in which the latch 62 moves out of the respective retaining hole 28 so as to permit the lid 4 to be moved to the open position.

Figure 7:
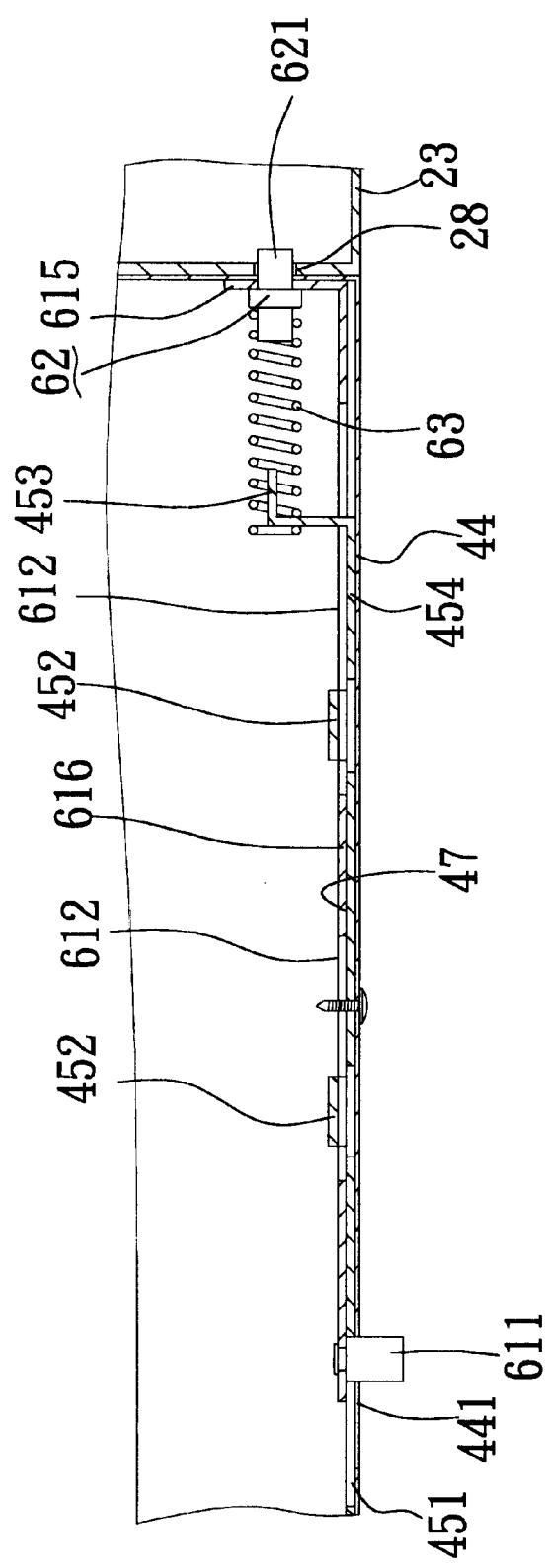
FIG. 7 is a fragmentary cross-sectional top view to illustrate the locking device at a locking position where the lid is held at a closed position.
Figure 8:
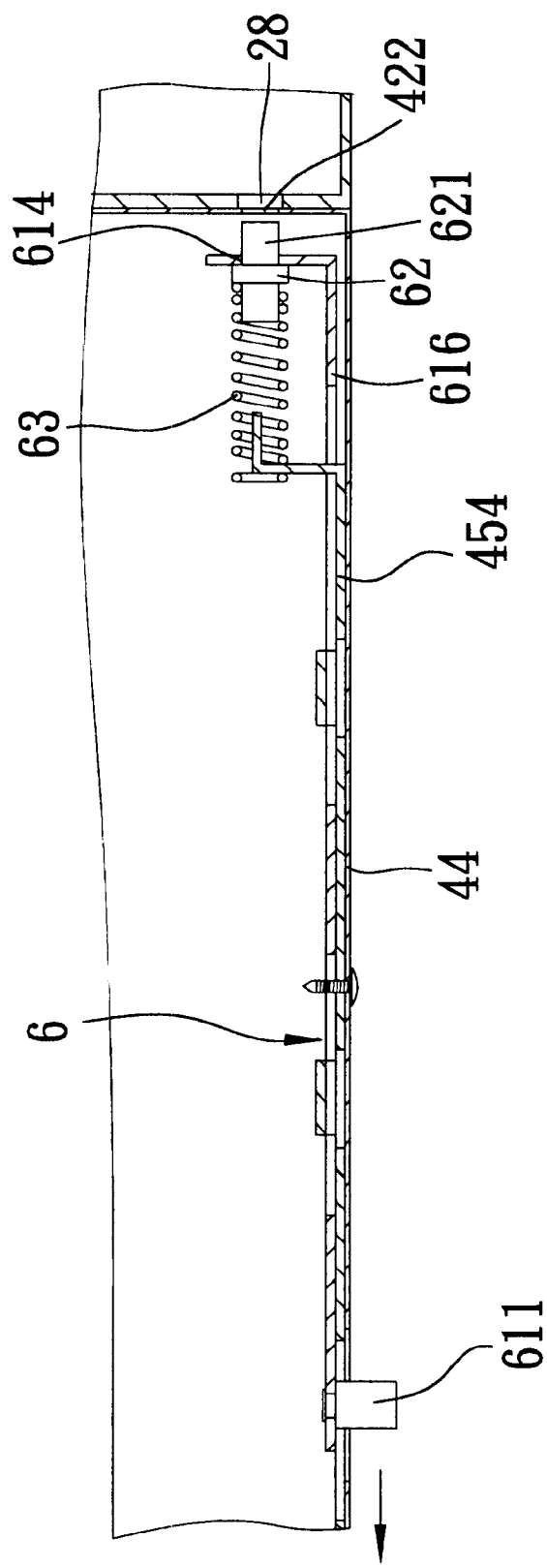
FIG. 8 is a fragmentary cross-sectional top view to illustrate the locking device at an unlocking position where the lid is turnable to an open position.

Referring to FIGS. 7 and 8, in combination with FIG. 5, the locking device 6 further includes at least a bracket 45, an operating lever 61, and a coil spring 63. The bracket 45 has a first plate piece 454 attached securely to the inner face 442 of the front plate 44, a pair of L-shaped hangers 46 projecting from and cooperating with the first plate piece 454 to define there among a retaining groove 47, and an L-shaped spring mounting tab 453 projecting from one end of the first plate piece 454 and then turning toward the retaining hole 28. Each of the hangers 46 has a first portion 455 extending from and transverse to the first plate piece 454 and a second portion 452 extending from the first portion 455 and parallel to the first plate piece 454. A pair of second slots 451 are formed in the first plate piece 454, and are respectively registered with the first slots 441.

The operating lever 61 has a second plate piece 616 placed side by side with the first plate piece 454 and formed with a pair of elongated sliding slots 612 that extend in the transverse direction and that are horizontally and respectively registered with the hangers 46, a knob 611 projecting from the second plate piece 616 through one of the second slots 451 in the first plate piece 454 and one of the first slots 441 in the front plate 44, and a latch mounting tab 615 projecting from and transverse to one end of the second plate piece 616 and horizontally registered with the spring mounting tab 453. A through-hole 614 is formed in the latch mounting tab 615.

The first portions 455 of the hangers 46 respectively extend through the sliding slots 612, while the second portions 452 of the hangers 46 extend upwardly from the first portions 455 to a position above peripheries of the sliding slots 612 so as to permit the second plate piece 616 to be seated and to slide on the first portions 455 of the hangers 46 in the transverse direction and to be limited within the retaining groove 47 by the second portions 452 of the hangers 46. The latch 62 has a rod portion 621 and a flange portion 622. The rod portion 621 extends in the transverse direction, and has two opposite ends. The flange portion 622 radially projects from the rod portion 621 between the opposite ends of the rod portion 621, and is disposed between the spring mounting tab 453 and the latch mounting tab 615. One of the opposite ends of the rod portion 621 extends from the flange portion 622 through the through-hole 614 in the latch mounting tab 615 and the through-hole 422 in the front end portion 431 of an adjacent one of the side plates 43 of the lid 6 and into the retaining hole 28 in an adjacent one of the side walls 23 when the latch 62 is at the locking position. The coil spring 63 has two opposite ends respectively sleeved on the spring mounting tab 453 and on the other one of the opposite ends of the rod portion 621 for urging the flange portion 622 to abut against the latch mounting tab 615 and for urging the latch 62 and the second plate piece 616 to move toward the retaining hole 28 in the respective one of the side walls 23.

The second plate piece 616 is operable by the knob 611 so as to be moved in the transverse direction against the coil spring 63 and to thereby move the latch 62 from the locking position (see FIG. 7) to the unlocking position (see FIG. 8).

Since the lid 4 can be turned to the open position and can be detached from the housing 2, the inconvenience as encountered in the prior art can be eliminated.

With the invention thus explained, it is apparent that various modifications and variations can be made without departing from the spirit of the present invention.

I claim:

1. An electrical oven comprising:

a housing defining an inner space therein and having top and bottom sides, left and right sides, front and rear sides, and a front opening at said front side for access to said inner space, said housing including a bottom wall that confines said inner space at said bottom side of said housing, two opposite side walls that project upwardly from said bottom wall to confine said inner space at said left and right sides of said housing, a lid that is mounted pivotally and selectively on one of said bottom wall and said side walls and that projects upwardly from said bottom wall to confine said inner space at said rear side of said housing and then turns frontwardly to said front side of said housing to confine said inner space at said top side of said housing, and a door that is mounted pivotally and selectively on one of said bottom wall and said side walls for closing said front opening, said lid being turnable relative to said bottom wall between a closed position, in which said lid confines said inner space at said rear and top sides of said housing, and an open position, in which said lid turns away from said door so as to permit said inner space to be exposed at said rear and top sides of said housing;

a locking device selectively mounted on one of said lid and said side walls so as to lock said lid unto at least one of said side walls when said lid is at said closed position; and at least an electrical heater mounted in said housing.

2. The electrical oven of claim 1, wherein said lid has a front top end at said front side of said housing above said door, at least one of said side walls being formed with a retaining hole adjacent to said front top end of said lid, said locking device including at least a spring-biased latch that is mounted movably on said front top end of said lid and that is operable to be moved in a transverse direction relative to said side walls between a locking position, in which said latch moves into said retaining hole so as to permit said lid to be held at said closed position, and an unlocking position, in which said latch moves out of said retaining hole so as to permit said lid to be moved to said open position.

3. The electrical oven of claim 2, wherein said lid is in the form of a shell, said front top end of said lid defining an inner mounting space therein and having a front plate that confines a front side of said inner mounting space, that extends between said side walls, that is substantially flush with said door, and that has an inner face, said locking device further including at least a bracket, an operating lever, and a coil spring, said bracket having a first plate piece attached securely to said inner face of said front plate, a pair of L-shaped hangers projecting from and cooperating with said first plate piece to define thereamong a retaining groove, and an L-shaped spring mounting tab projecting from one end of said first plate piece and then turning toward said retaining hole, each of said hangers having a first portion transverse to said first plate piece and a second portion extending from said first portion and parallel to said first plate piece, said operating lever having a second plate piece placed side by side with said first plate piece and formed with a pair of elongated sliding slots that extend in said transverse direction and that are horizontally and respectively registered with said hangers, a knob projecting from said second plate piece through said first plate piece and said front plate, and a latch mounting tab projecting from and transverse to one end of said second plate piece and horizontally registered with said spring mounting tab, said first portions of said hangers respectively extending through said sliding slots, said second portions of said hangers extending upwardly from said first portions to a position above peripheries of said sliding slots so as to permit said second plate piece to be seated and to slide on said first portions of said hangers in said transverse direction and to be limited within said retaining groove by said second portions of said hangers, said latch having a rod portion and a flange portion, said rod portion extending in said transverse direction and having two opposite ends, said flange portion radially projecting from said rod portion between said opposite ends of said rod portion and being disposed between said spring mounting tab and said latch mounting tab, one of said opposite ends of said rod portion extending from said flange portion through said latch mounting tab and into said retaining hole when said latch is at said locking position, said coil spring being sleeved on said spring mounting tab and on the other one of said opposite ends of said rod portion for urging said flange portion to abut against said latch mounting tab and for urging said latch and said second plate piece to move toward said retaining hole, said second plate piece being operable by said knob so as to be moved in said transverse direction against said coil spring and to thereby move said latch from said locking position to said unlocking position.

4. The electrical oven of claim 1, wherein said lid has a front top end at said front side of said housing above said door and a rear bottom end at said rear and bottom sides of said hosing, said side walls being formed with opposite pivotal notches at said rear and bottom sides of said housing, said rear bottom end of said lid being pivoted to said side walls at said pivotal notches so as to permit said lid to be detachable from said side walls.

5. The electrical oven of claim 4, wherein at least one of said side walls is further formed with a retaining hole adjacent to said front top end of said lid, said locking device including at least a spring-biased latch that is mounted movably on said front top end of said lid and that is operable to be moved in a transverse direction relative to said side walls between a locking position, in which said latch moves into said retaining hole so as to permit said lid to be held at said closed position, and an unlocking position, in which said latch moves out of said retaining hole so as to permit said lid to be moved to said open position.

\* \* \* \* \*